(12) United States Patent
Chatterjee et al.

(10) Patent No.: US 11,874,688 B2
(45) Date of Patent: Jan. 16, 2024

(54) IDENTIFICATION OF DIAGNOSTIC MESSAGES CORRESPONDING TO EXCEPTIONS

(71) Applicant: Hewlett Packard Enterprise Development LP, Houston, TX (US)

(72) Inventors: Soumitra Chatterjee, Karnataka (IN); Balasubramanian Viswanathan, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 259 days.

(21) Appl. No.: 17/519,179

(22) Filed: Nov. 4, 2021

(65) Prior Publication Data
US 2023/0028560 A1 Jan. 26, 2023

(30) Foreign Application Priority Data

Jul. 23, 2021 (IN) .............................. 202141033245

(51) Int. Cl.
*G06F 11/36* (2006.01)
*G06N 3/04* (2023.01)
*G06N 3/08* (2023.01)

(52) U.S. Cl.
CPC ........... *G06F 11/3624* (2013.01); *G06N 3/04* (2013.01); *G06N 3/08* (2013.01)

(58) Field of Classification Search
None
See application file for complete search history.

(56) References Cited

U.S. PATENT DOCUMENTS

| 6,654,949 | B1 * | 11/2003 | Fraenkel | G06F 11/3466 717/124 |
|---|---|---|---|---|
| 6,851,071 | B2 | 2/2005 | Bossen et al. | |
| 7,065,566 | B2 | 6/2006 | Menard et al. | |
| 7,424,666 | B2 | 9/2008 | Chandwani et al. | |
| 7,937,623 | B2 | 5/2011 | Ramacher et al. | |
| 10,089,214 | B1 | 10/2018 | Dixit | |
| 10,442,449 | B2 | 10/2019 | Singh | |
| 11,003,773 | B1 * | 5/2021 | Fang | H04L 63/0263 |
| 11,715,051 | B1 * | 8/2023 | Baskaran | G06N 5/04 707/758 |
| 2003/0159133 | A1 * | 8/2003 | Ferri | G06F 11/3636 714/E11.212 |
| 2004/0243636 | A1 | 12/2004 | Hasiewicz et al. | |
| 2013/0074045 | A1 * | 3/2013 | Bates | G06F 11/362 717/124 |

(Continued)

FOREIGN PATENT DOCUMENTS

| KR | 20190020363 A | * | 8/2017 |
| WO | WO0237940 W | | 5/2002 |

(Continued)

*Primary Examiner* — Philip Wang
(74) *Attorney, Agent, or Firm* — Hewlett Packard Enterprise Patent Department

(57) ABSTRACT

Example techniques for identification of diagnostic messages corresponding to exceptions are described. A determination model may determine whether a set of diagnostic messages generated based on analysis of a source code includes a diagnostic message that likely corresponds to an exception. The determination may be used to identify a set of diagnostic messages including the diagnostic message that likely corresponds to an exception.

20 Claims, 7 Drawing Sheets

(56) References Cited

U.S. PATENT DOCUMENTS

| | | | |
|---|---|---|---|
| 2014/0068567 A1* | 3/2014 | Smith | G06F 9/4498 717/128 |
| 2016/0306612 A1* | 10/2016 | Hewitt | G06F 11/3688 |
| 2017/0351241 A1 | 12/2017 | Bowers et al. | |
| 2019/0065990 A1 | 2/2019 | Sharma et al. | |
| 2019/0079506 A1* | 3/2019 | Hubauer | G05B 23/0208 |
| 2019/0304849 A1 | 10/2019 | Cheong et al. | |
| 2019/0347149 A1* | 11/2019 | Panigrahi | G06F 16/24578 |
| 2019/0347590 A1 | 11/2019 | Rajasekaran et al. | |
| 2020/0067789 A1 | 2/2020 | Khuti et al. | |
| 2020/0259700 A1 | 8/2020 | Bhalla et al. | |
| 2021/0303298 A1* | 9/2021 | Sazhin | G06F 8/77 |

FOREIGN PATENT DOCUMENTS

| | | |
|---|---|---|
| WO | WO2018234741 | 12/2018 |
| WO | WO2020142542 A1 | 7/2020 |

* cited by examiner

IDENTIFICATION OF DIAGNOSTIC MESSAGES CORRESPONDING TO EXCEPTIONS

BACKGROUND

Diagnostic messages may be generated when a source code is analyzed. A diagnostic message may indicate the presence of a defect in the source code that may potentially cause the occurrence of an anomalous or an exceptional condition during execution of an executable file generated from the source code. The anomalous or the exceptional condition breaks the normal flow of execution of the executable file and may be referred to as an exception.

BRIEF DESCRIPTION OF DRAWINGS

The following detailed description references the figures, wherein.

DETAILED DESCRIPTION

Figure 1:
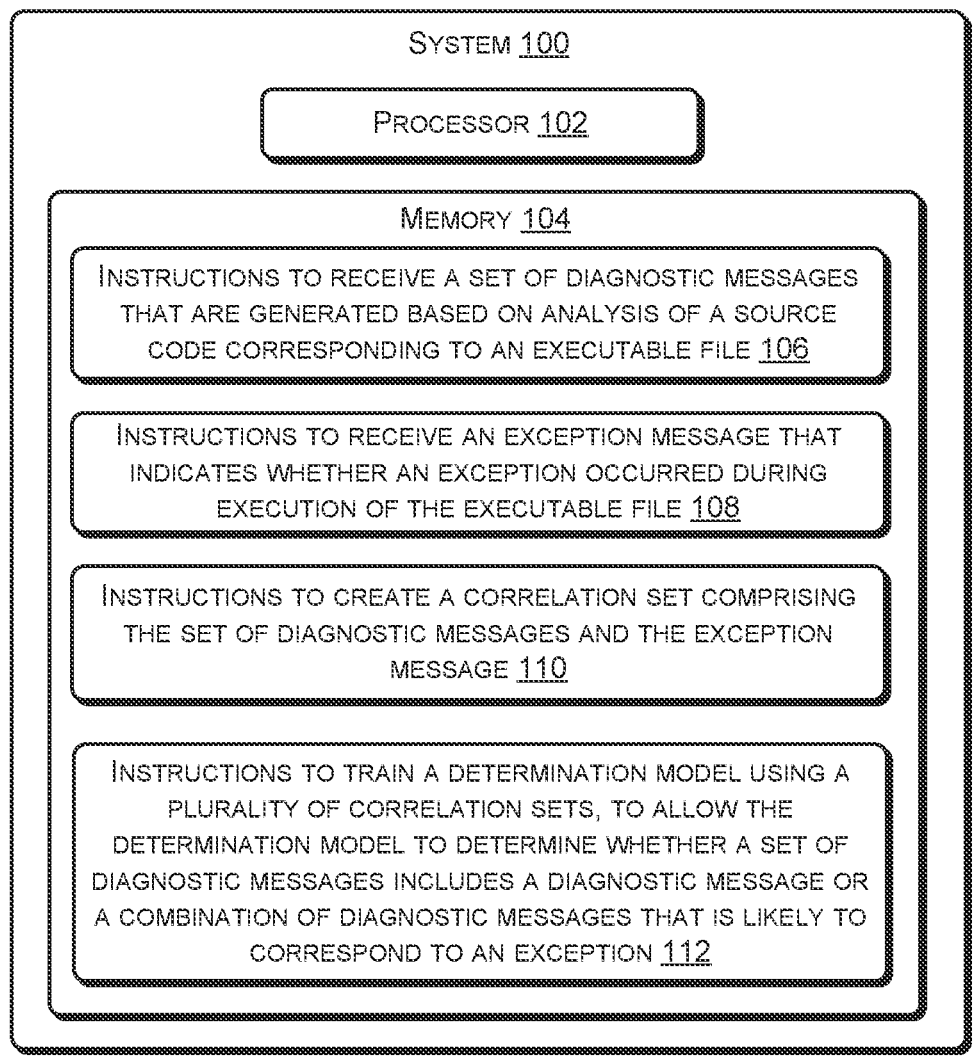
FIG. 1 illustrates a system that facilitates identification of source code diagnostic messages that are likely to correspond to exceptions, according to an example implementation of the present subject matter.

During software development, a source code may be analyzed to identify defects in the source code. The analysis may be performed, for example, by a compiler or a static analysis tool. As a result of the analysis, diagnostic messages may be generated that indicate the defects in the source code. For example, a diagnostic message may indicate that a variable is used in the source code without being initialized. The diagnostic messages may include, for example, error messages and warning messages.

Generally, a large number of diagnostic messages are generated in response to the analysis of the source code. A diagnostic message may be an error diagnostic message or a non-error diagnostic message. Typically, defects indicated by all the error diagnostic messages are resolved, as the error diagnostic messages may indicate serious defects in the source code and in some cases, may prevent a build of the source code. However, some of the non-error diagnostic messages, which may include warning messages, may be ignored by developers. The non-error diagnostic messages may be ignored, for example, because the non-error diagnostic messages may in a large number and because they may not prevent the build of the source code. The non-error diagnostic messages may be ignored also because the impact caused by the defects indicated by the non-error diagnostic messages during execution of an executable file generated by the source code may not be known. For example, the developer may not know as to whether the non-initialization of a variable (which is a defect indicated by a non-error diagnostic message) would cause an exception during the execution of the executable file. Since some non-error diagnostic messages may be ignored, a software including the executable file may be released for the use of end-users without resolution of the defects indicated by the non-error diagnostic messages.

In some cases, the defects indicated by one or more non-error diagnostic messages may cause exceptions during execution of the executable file. Thus, the release of the software without resolving the defects indicated by the non-error diagnostic messages may cause exceptions during usage of the software by the end-users.

The present subject matter relates to identification of diagnostic messages that correspond to exceptions. With the implementations of the present subject matter, diagnostic messages indicative of defects that may cause exceptions during execution of a corresponding executable file may be accurately identified.

In accordance with an example implementation, a set of diagnostic messages that are generated based on analysis of a source code may be received. Further, a diagnostic message from among the set of diagnostic messages that is likely to correspond to an exception may be identified. A diagnostic message that is likely to correspond to an exception refers to a diagnostic message indicative of a defect that is likely to cause an exception when an executable file generated from the source code is executed. A diagnostic message that is likely to correspond to an exception may also be referred to as a potentially-problematic diagnostic message. The identified diagnostic message may be prioritized, such as displayed at the top of a list of diagnostic messages or highlighted. The developer may then resolve the defects indicated by the prioritized diagnostic messages, thereby preventing occurrence of exceptions during execution of the executable file.

In an implementation, a combination of diagnostic messages that is potentially problematic may also be identified. For example, it may be identified that if the diagnostic messages include a particular set of diagnostic messages, an exception is likely to be encountered if the corresponding executable file is executed. Upon identification of the potentially-problematic combination, the diagnostic messages belonging to the combination may be prioritized for resolution.

In an implementation, to identify the potentially-problematic diagnostic message or the potentially-problematic combination, a determination model may be utilized. The determination model may be trained to determine whether a set of diagnostic messages includes a potentially-problematic diagnostic message or a potentially-problematic combination. In response to a positive determination, a plurality of subsets of diagnostic messages may be generated from the set of diagnostic messages and each subset may be provided as input to the determination model. The determination model may then determine the subset that has the potentially-problematic diagnostic message/combination. Based on determination of the subset that has the potentially-problematic diagnostic message/combination, a potentially-problematic set may be identified. The potentially-problematic set may include the potentially-problematic diagnostic message/combination. In an example, in addition to the potentially-problematic diagnostic message/combination, the potentially-problematic set may include a diagnostic message that does not correspond to an exception.

To train the determination model to determine whether a set of diagnostic messages includes a potentially-problematic diagnostic message/combination or not, a plurality of sets of diagnostic messages is received, where each set of diagnostic messages is generated based on analysis of a source code. Each source code corresponds to an executable file. A source code corresponding to an executable file may refer to a source code from which the executable file may be generated, for example, upon compilation of the source code. Accordingly, a first set of diagnostic messages is generated based on analysis of a first source code corresponding to a first executable file and a second set of diagnostic messages is generated based on analysis of a second source code corresponding to a second executable file. Subsequently, when the executable files are executed, some or all of them may throw exceptions, based on which exception messages may be generated. Such exception messages corresponding to each executable file may also be received. An exception message corresponding to an executable file may indicate whether an exception occurred during execution of the corresponding executable file. For instance, a first exception message indicates as to whether an exception was encountered during execution of the first executable file and a second exception message indicates as to whether an exception was encountered during execution of the second executable file.

A plurality of correlation sets, each having a set of diagnostic messages and an exception message corresponding to the same executable file, is created. For instance, a first correlation set having the first set of diagnostic messages and the first exception message and a second correlation set having the second set of diagnostic messages and the second exception message are created. The created correlation sets are used for training the determination model. In an implementation, the determination model may be a machine learning model, a neural network model, or the like. The trained determination model may be used during development of a software for prioritizing potentially-problematic messages/combination for resolution.

The present subject matter thus allows identification of potentially-problematic diagnostic messages and combinations and prioritizing such diagnostic messages and combinations during development of software code. The prioritization may be used by a developer to resolve the defects indicated by the diagnostic messages before the executable file is released for its intended use. Accordingly, occurrence of exceptions due to these defects may be avoided when the corresponding executable file is executed. In case a further exception is encountered on execution of the executable file, the model may be trained based on the diagnostic message set generated during development of the source code and the exception message. Thus, the model may get more accurate in identifying potentially problematic diagnostic messages overtime.

The present subject matter may indicate the individual diagnostic messages and combinations of diagnostic messages that are potentially problematic with high confidence and accuracy. Thus, a developer may focus on resolving the defects indicated by the individual diagnostic messages and the diagnostic messages in the combination, while ignoring the other diagnostic messages that are not prioritized or flagged. Thus, the present subject matter helps to achieve exception-free execution of executable files while also reducing the number of defects to be resolved to this end.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

FIG. 1 illustrates a system 100 that facilitates identification of diagnostic messages that are likely to correspond to exceptions, according to an example implementation of the present subject matter. A diagnostic message may be generated based on analysis of a source code corresponding to an executable file, and may indicate the presence of a defect in the source code. A source code corresponding to an executable file refers to a source code from which the executable file is or can be generated, for example, by compilation of the source code. The executable file may be part of, for example, a software or a firmware.

A diagnostic message is likely to correspond to an exception if the diagnostic message is indicative of a defect that is likely to cause the occurrence of an exception if the executable file is executed. A diagnostic message that is likely to correspond to an exception may also be referred to as a potentially-problematic diagnostic message. An exception may refer to an anomalous or exceptional condition. Examples of exception that may occur during execution of an executable file are memory access violation and stack overflow.

The system 100 may be implemented as a computing device, such as a desktop computer, a laptop computer, or a server. In another implementation, the system 100 may include a plurality of computing devices. The system 100 includes a processor 102 and a memory 104 coupled to the processor 102.

The processor 102 may be implemented as a microprocessor, a microcomputer, a microcontroller, a digital signal processor, a central processing s unit, a state machine, a logic circuitry, and/or any device that can manipulate signals based on operational instructions. Among other capabilities, the processor 102 may fetch and execute computer-readable instructions included in the memory 104. The computer-readable instructions may include instructions 106-112. The functions of the processor 102 may be provided through the use of dedicated hardware as well as hardware capable of executing machine-readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the system 100 may also include interface(s) and system data (not shown in FIG. 1). The interface(s) may include a variety of instructions-based interfaces and hardware interfaces that allow interaction with a user and with other communication and computing devices, such as network entities, web servers, external repositories, and peripheral devices. The system data may serve as a repository for storing data that may be fetched, processed, received, or created by the instructions.

In operation, the instructions 106 are executable to receive sets of diagnostic messages that are generated based on analysis of source codes corresponding to executable files. For instance, a first set of diagnostic messages that are generated based on analysis of a first source code corresponding to a first executable file, and a second set of diagnostic messages that are generated based on analysis of a second source code corresponding to a second executable file may be received.

The instructions 108 are executable to receive an exception message. An exception message may indicate whether an exception occurred during execution of an executable file. For example, a first exception message may indicate whether an exception occurred during execution of the first executable file and a second exception message may indicate whether an exception occurred during execution of the second executable file.

The instructions 110 are executable to create a plurality of correlation sets, where each correlation set includes a set of diagnostic messages and an exception message that each correspond to the same executable file. For example, a first correlation set including the first set of diagnostic messages and the first exception message, and a second correlation set including the second set of diagnostic messages and the second exception message may be created.

Using the created correlation sets, the instructions 112 are executable to train a determination model (not shown in FIG. 1). Since the determination model is trained over a plurality of sets of diagnostic messages and their corresponding exception messages, the determination model may predict the exception message that would be obtained for a third set of diagnostic messages corresponding to a third executable file. For example, the determination model may predict that the execution of the third executable file would result in an exception. The third set of diagnostic messages may be generated based on analysis of a third source code corresponding to the third executable file. As will be understood, the exception is due to a defect indicated by a diagnostic message or a combination of defects indicated by a combination of diagnostic messages in the third set. Accordingly, the prediction whether the execution of the third executable file would result in an exception may be referred to as a determination whether the third set of diagnostic messages includes a potentially-problematic diagnostic message or a potentially-problematic combination of diagnostic messages, which likely corresponds to an exception. Based on the determination, a potentially-problematic set may be identified. The potentially-problematic set may include the potentially-problematic diagnostic message or combination. In an example, the potentially-problematic set may also include one or more diagnostic messages that are not potentially-problematic and that do not form part of a potentially-problematic combination.

In an example, the determination model may be a neural network model, such as a long short-term memory (LSTM) model. Further, the training of the determination model may include adjustment of weights and biases of the neural network model. In another example, the determination model may be a machine learning model based on other machine learning techniques.

Figure 2:
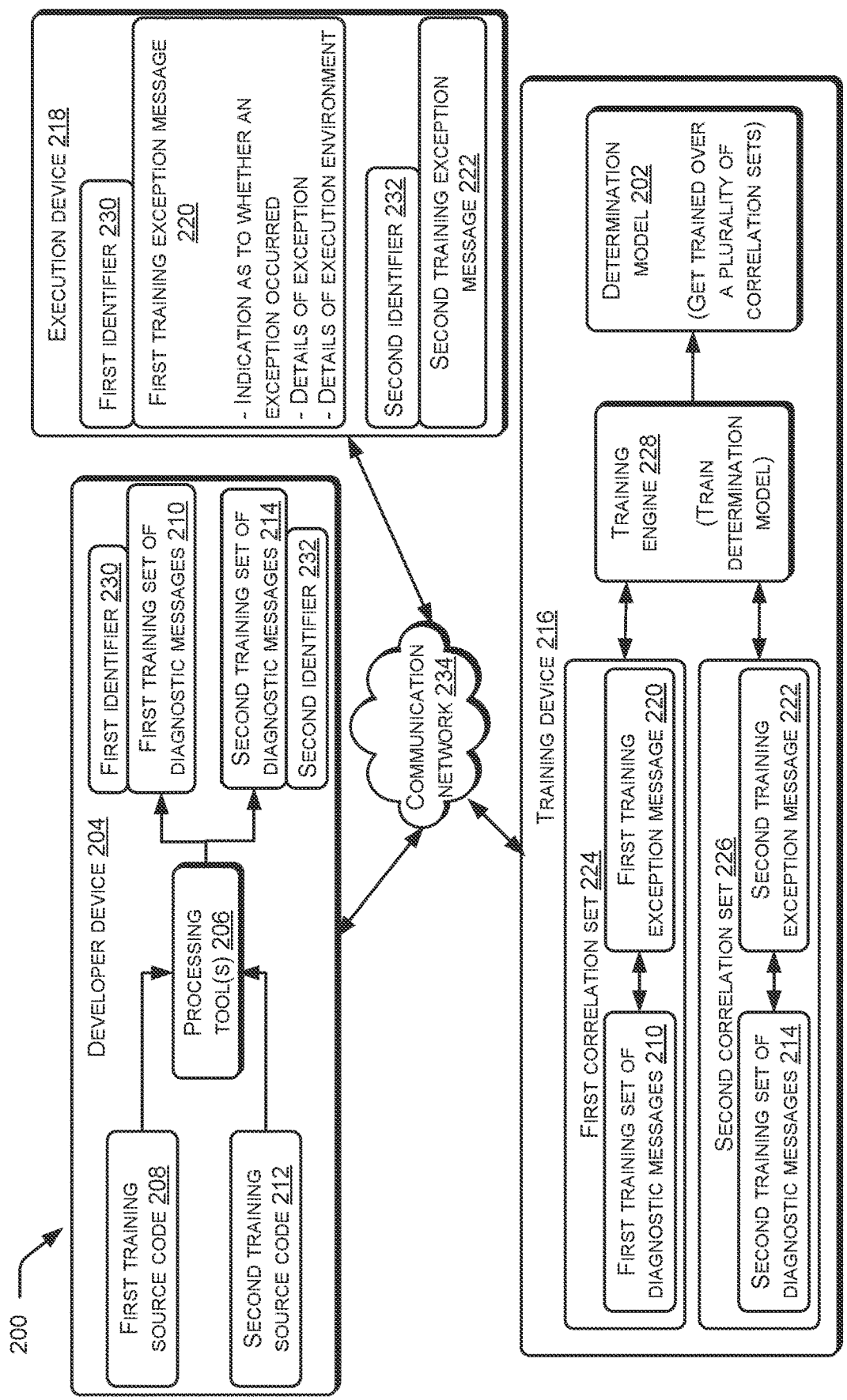
FIG. 2 illustrates a computing environment in which a determination model is trained, according to an example implementation of the present subject matter.

FIG. 2 illustrates a computing environment 200 in which a determination model 202 is trained, according to an example implementation of the present subject matter. The computing environment 200 includes a developer device 204 that may be utilized by a software developer for writing a source code. The developer device 204 may include processing tool(s) 206 that may, among other things, analyze the source code. The analysis of the source code may involve identification of defects in the source code and may include, for example, compilation of the source code, static analysis of the source code, and the like. The processing tool(s) 206 may include, for example, a compiler, a static analysis tool, or both. Based on an analysis of the source code, the processing tool(s) 206 may generate diagnostic messages where each diagnostic message indicates a defect in the source code.

A diagnostic message may be, for example, an error diagnostic message (also referred to as an error message) or a non-error diagnostic message (also referred to as a non-error message). An error message may indicate, for example, the presence of a typographical error, a syntax error, a missing semicolon (each of which is a defect), or the like in the source code. An error message may prevent completion of compilation and prevent generation of an executable file from the source code. A non-error message may not prevent generation of an executable file from the source code, and may be, for example, a warning message. Examples of warning messages include a message indicating usage of a variable without initializing the variable, a message indicating conditional initialization of a variable, and a message indicating the absence of a return statement (each of which indicates a defect in the source code).

A developer who receives the generated diagnostic messages may resolve the defects indicated by the error messages but may ignore the defects indicated by at least some of the non-error messages. The defects indicated by s the non-error messages may be ignored because such defects may not prevent generation of an executable file from the source code. Such defects may be ignored also because not all such defects may impact execution of the executable file and because the developer and the processing tool(s) 206 may be unaware of the defect that may impact execution of the executable file. For instance, the developer and the processing tool(s) 206 may be unaware as to which defect may cause an exception during execution of the executable file. Another reason for ignoring the non-error messages is that the number of such messages may be large, and resolving the defects indicated by such messages may be time-consuming.

To identify the non-error messages that are indicative of defects that may cause an exception during execution of the executable file, the determination model 202 may be utilized. The determination model 202 may be trained to identify such non-error messages. To train the determination model 202, the developer device 204 may collate the non-error messages generated based on analysis of a source code into a set of diagnostic messages. For example, the developer device 204 may analyze a first source code 208 and collate the non-error messages generated based on the analysis as a first set of diagnostic messages 210. Similarly, the developer device 204 may analyze a second source code 212 and collate the non-error messages generated based on the analysis as a second set of diagnostic messages 214.

In an example, an executable file may be generated based on compilation of multiple source codes. For instance, the executable file may be generated using multiple object files, where each object file is generated due to compilation of one source code. In accordance with the example, a set of diagnostic messages may include diagnostic messages generated due to compilation of all source codes corresponding to an executable fie. For instance, if the first source code 208 and another source code (not shown in FIG. 2) both correspond to one executable file, the non-error diagnostic messages generated based on analysis of the first source code 208 and the non-error diagnostic messages generated based on analysis of the other source code form part of the first set of diagnostic messages 210.

Since the first set of diagnostic messages 210 and the second set of diagnostic messages 214 are used for training of the determination model 202, the first set of diagnostic messages 210 and the second set of diagnostic messages 214 may also be referred to as the first training set of diagnostic messages 210 and the second training set of diagnostic messages 214 respectively. Similarly, other sets of diagnostic messages, which are non-error messages generated based on analysis of other source codes, may also be referred to as training sets of diagnostic messages. Further, the first source code 208 and the second source code 212 may be referred to as the first training source code 208 and the second training source code 212 respectively. Hereinafter, the term "diagnostic message" will be used to denote a non-error diagnostic message. Further, a set of diagnostic messages may be simply referred to as "a set". For example, the first set of diagnostic messages 210 may be referred to as the first set 210 and the second set of diagnostic messages 214 may be referred to as the second set 214.

In an implementation, the order of diagnostic messages in a set of diagnostic messages may be same as the order in which the defects are present in the corresponding source code. For example, if a first defect in a source code is followed by a second defect in a source code, a first diagnostic message corresponding to the first defect is followed by a second diagnostic message corresponding to the second defect in the set of diagnostic messages. Further, the set of diagnostic messages may also include the line number of the source code in which a particular defect is encountered along with the corresponding diagnostic message. Accordingly, the sequence of defects in the source code is captured in the set. The capturing of the sequence of defects in the source code in the set allows identifying a sequence of defects that may cause an exception, as will be explained later.

The training of the determination model 202 may be carried out in a training device 216. Accordingly, the developer device 204 may transmit the first set 210, the second set 214, and other training sets of diagnostic messages to the training device 216. In an example, if the training device 216 receives a set of diagnostic messages, such as the first set 210, more than once, the training device 216 may delete the subsequently-received set of diagnostic messages to avoid wastage of storage space. To perform the deletion, the training device 216 may compare a received set with other sets stored therein. If the received set matches with any of the stored sets, the training device 216 may delete the received set. In an example, to avoid wastage of storage space, sets of diagnostic messages that have already been used for training the determination model 202 may be deleted. In a further example, sets of diagnostic messages that are older than a certain age may be deleted.

The developer device 204 may also generate an executable file from a successfully-compiled source code. The executable file may be sent to an execution device 218 for execution. For example, the developer device 204 may send a first executable file (not shown in FIG. 2) corresponding to the first source code 208 and a second executable file (not shown in FIG. 2) corresponding to the second source code 212 to the execution device 218. The first executable file may also be referred to as a first training executable file and the second executable file may also be referred to as a second training executable file.

The execution device 218 may execute an executable file and monitor the occurrence of exceptions during the execution. Further, the execution device 218 may generate an exception message indicating whether an exception was encountered during execution of the executable file. Accordingly, a first exception message 220 indicating whether an exception was encountered during execution of the first executable file and a second exception message 222 indicating whether an exception was encountered during execution of the second executable file may be generated. The first exception message 220, the second exception message 222, and other exception messages generated based on execution of other executable files may be used for training of the determination model 202. Accordingly, the first exception message 220 and the second exception message 222 may also be referred to as the first training exception message 220 and the second training exception message 222 respectively. To allow the training, the execution device 218 may send the first exception message 220 and the second exception message 222 to the training device 216.

An exception may be encountered during execution of an executable file due to a defect in the corresponding source code, which is indicated by a diagnostic message that would have been generated during analysis of the source code. Accordingly, a diagnostic message among a set of diagnostic messages that were generated during analysis of the source code indicates the cause of an exception encountered during the execution of the executable file. That is, a diagnostic message from among the set of diagnostic messages corresponds to an exception and is problematic.

In an implementation, instead of a single diagnostic message, a combination of a plurality of diagnostic messages in the set of diagnostic messages may be problematic. For instance, the presence of either a first defect indicated by a first diagnostic message or a second defect indicated by a second diagnostic message in the first source code 208 may not lead to an exception. However, the presence of both the first defect and the second defect in the first source code 208 may lead to an exception. As an example, the presence of a diagnostic message indicating that integer conversion made a variable unsigned in isolation may not be problematic. However, the presence of such a diagnostic message along with another diagnostic message indicating that the unsigned variable is compared with a zero value may be problematic.

To facilitate identification of a potentially-problematic diagnostic message or a potentially-problematic combination of diagnostic messages, a set of diagnostic messages corresponding to an executable file (e.g., the set of diagnostic messages generated during analysis of a source code corresponding to the executable file) is correlated with an exception message corresponding to the executable file. The correlation between the set of diagnostic messages and the exception message forms a correlation set. For example, the first set 210 may be correlated with the first exception message 220 to form a first correlation set 224 and the second set 214 may be correlated with the second exception message 222 to form a second correlation set 226. The correlation sets are provided to a training engine 228 that is to train the determination model 202. In an example, the training engine 228 may be implemented by executing the instructions 112 (not shown in FIG. 2).

In an example, the determination model 202 may be a neural network model, such as an LSTM model. The training may involve providing diagnostic messages of a set as an input to the neural network model. The training may also involve adjustment of weights and biases of the neural network model such that the neural network model may provide an exception message corresponding to the inputted set as an output. For example, the weights and biases may be adjusted such that the neural network model outputs the first exception message 220 as an output if the first set 210 is supplied as the input and such that the neural network model outputs the second exception message 222 as an output if the second set 214 is supplied as the input.

Upon the training, the determination model 202 may predict whether an exception would be caused if a particular executable file is executed. For the prediction, the determination model 202 may be provided with diagnostic messages generated based on analysis of a source code corresponding to that executable file. The determination model 202 may then predict an exception message that would be outputted if the executable file is executed. The exception message indicates whether an exception would be encountered during execution of the executable file. The prediction by the determination model 202 can be used to identify a potentially-problematic diagnostic message or combination from a set of diagnostic messages, as will be explained with reference to FIG. 4.

In an implementation, the determination model 202 may be continually trained. For example, new correlation sets may be created as new sets of diagnostic messages and new exception messages arrive and the determination model 202 may be trained using the new correlation sets. The continual learning improves accuracy of the determination model 202 over time.

In some cases, a particular sequence of a set of defects in a source code may lead to an exception, while another sequence made up of the same set of defects may not lead to an exception. For example, a first defect followed by a second defect in the source code may lead to an exception, while the second defect followed by the first defect may not lead to the exception. Since, as explained earlier, a set of diagnostic messages captures the order of defects in a source code, the training using such sets may allow the determination model 202 to correctly identify the order of diagnostic messages for which an exception is likely to be encountered. For example, the determination model 202 may predict that an exception would be encountered if the set of diagnostic messages inputted to it has the first diagnostic message followed by the second diagnostic message and may not make such a prediction if the second diagnostic message is followed by the first diagnostic message in the inputted set of diagnostic messages. To ensure that an exception is predicted for a particular sequence of diagnostic messages and not for another sequence made up of the same combination of diagnostic messages, a suitable model that can process sequences of data points may be selected as the determination model 202. One such model is the LSTM model.

In an implementation, to enable the training device 216 to identify a set of diagnostic messages to which a particular exception message corresponds and to enable formation of a corresponding correlation set, the set of diagnostic messages and the corresponding executable file may be tagged with an identifier. For example, the first set 210 and the first executable file may be tagged with a first identifier 230 and the second set 214 and the second executable file may be tagged with a second identifier 232. The tagging of an executable file may be performed such that the identifier does not hamper the execution of the executable file. For example, the tagging may be performed by embedding the identifier in a "comments" section of the executable file. The tagging may be performed by the developer device 204. The identifier with which a set of diagnostic messages and an executable file is tagged may be different than other identifiers with which other sets of diagnostic messages and other executable files are tagged. For example, the first identifier 230 may be different than the second identifier 232 and identifiers with which other sets of diagnostic messages and other executable files are tagged. Accordingly, an identifier may be unique to a particular set of diagnostic messages and a particular executable file, and may also be referred to as a unique identifier.

The developer device 204 may send the first identifier 230 and the second identifier 232 to the training device 216 along with the first set 210 and the second set 214 respectively. Further, the developer device 204 may send the first identifier 230 and the second identifier 232 to the execution device 218 along with the first executable file and the second executable file respectively. The execution device 218 may tag an exception message corresponding to an executable file with an identifier corresponding to the executable file. For example, upon generation of the first exception message 220, the execution device 218 may tag the first exception message 220 with the first identifier 230 and send both the first exception message 220 and the first identifier 230 to the training device 216. Similarly, the execution device 218 may tag the second exception message 222 with the second identifier 232 and send both the second exception message 222 and the second identifier 232 to the training device 216.

The training device 216, upon receiving an exception message, may compare the identifier with which the exception message is tagged with identifiers of sets of diagnostic messages received in the training device 216. The training device 216 may then correlate the exception message with the set of diagnostic messages that has the same identifier as the exception message. For instance, based on a comparison of an identifier with which the first exception message 220 is tagged (which is the first identifier 230) with identifiers of sets of diagnostic messages in the training device 216 (e.g., the first identifier 230 and the second identifier 232), the training device 216 may determine that the first exception message 220 corresponds to the first set 210. Since an identifier is unique to a set of diagnostic messages and an executable file, a situation in which an exception message is incorrectly correlated is avoided. For instance, since the first identifier 230 and the second identifier 232 are not the same, the correlation of the first exception message 220 with the second set 214 is avoided.

As explained above, an exception message includes an indication as to whether an exception occurred. In an implementation, the exception message may also include details regarding the exception encountered. For instance, the exception message may indicate that the exception encountered is a memory access violation, a stack overflow, or the like. Since the exception message includes details of the exception, the determination model 202 is trained using the details of the exception as well. Such a training allows the determination model 202 to indicate the exception that is likely to be caused if a particular executable file is executed. Thus, in addition to predicting that an exception is likely to be encountered, the determination model 202 may also provide details of the likely exception.

In some cases, the execution of an executable file may cause more than one exception. In such cases, the exception message generated may include details of all the exceptions encountered during the execution. Further, in an implementation, the exception message may include details of execution environment in which the execution was carried out. The details of the execution environment may include, for example, operating system of the execution device 218 (the device in which the execution was carried out), processor configuration of the execution device 218, firmware and software installed in the execution device 218, and shared libraries installed in the execution device 218. The details of the execution environment may be included in the exception message because the execution environment may also contribute to the occurrence of the exception. For example, the defect corresponding to the first diagnostic message may cause an exception when the first executable file is executed in a first operating system but may not cause an exception when the first executable file is executed in a second operating system. By utilizing the details of the execution environment in the exception messages, the determination model 202 may determine, for example, that an exception would be encountered if an executable file is executed in a first execution environment and would not be encountered if the executable file is executed in a second execution environment.

In an implementation, a set of diagnostic messages may be correlated with multiple non-identical exception messages. The different exception messages that are correlated to the same set of diagnostic messages may differ from each other in terms of the details of the exception, details of the execution environment, and the like. Thus, a single set of diagnostic messages may be part of multiple correlation sets. Such correlation sets allow training of the determination model 202 using the details of the exception and the details of the execution environment.

Although in FIG. 2, a single developer device is shown, in an implementation, the computing environment 200 may include a plurality of developer devices, each of which generates sets of diagnostic messages based on analysis of source codes. Further, each developer device may send the generated sets of diagnostic messages to the training device 216 and the executable file to an execution device. Similarly, although a single execution device is shown in FIG. 2, the computing environment 200 may include a plurality of execution devices, each of which executes an executable file received from a developer device. Further, each execution device may send the generated exception message to the training device 216.

In an example, the training device 216 may belong to an organization that is developing the executable file. Thus, the determination model 202 may be trained using sets of diagnostic messages and exception messages generated within the organization. By utilizing a device belonging to the developing organization for the training, it may be ensured that the sets of diagnostic messages and the exception messages are not available outside of the organization. In another example, the training device 216 may not belong to the developing organization, but may be common to several developing organizations. In accordance with the example, the determination model 202 may be trained using sets of diagnostic messages and exception messages provided by several developing organizations.

In an implementation, the system 100, as explained with reference to FIG. 1, may include a computing device that is involved in the generation of diagnostic messages, a computing device that is involved in the execution of executable files, and a computing device that is involved in the training of determination model 202. Accordingly, the system 100 may include the developer device 204, the training device 216, and the execution device 218. In another implementation, the system 100 may include the device that performs the training of the determination model 202 (the training device 216) and not the devices that are involved in the generation of diagnostic messages and the execution of executable files. Although the generation of diagnostic messages, the execution of executable files, and the training of determination model 202 are explained as being performed in different computing devices, in some implementations, one or more of these functions may be performed by a single computing device.

The computing environment 200 includes a communication network 234 over which the various computing devices of the computing environment 200 may communicate with each other. The communication network 234 may be a wireless or a wired network, or a combination thereof. The communication network 234 may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 234 may include various network entities, such as transceivers, gateways, and routers.

Figure 3:
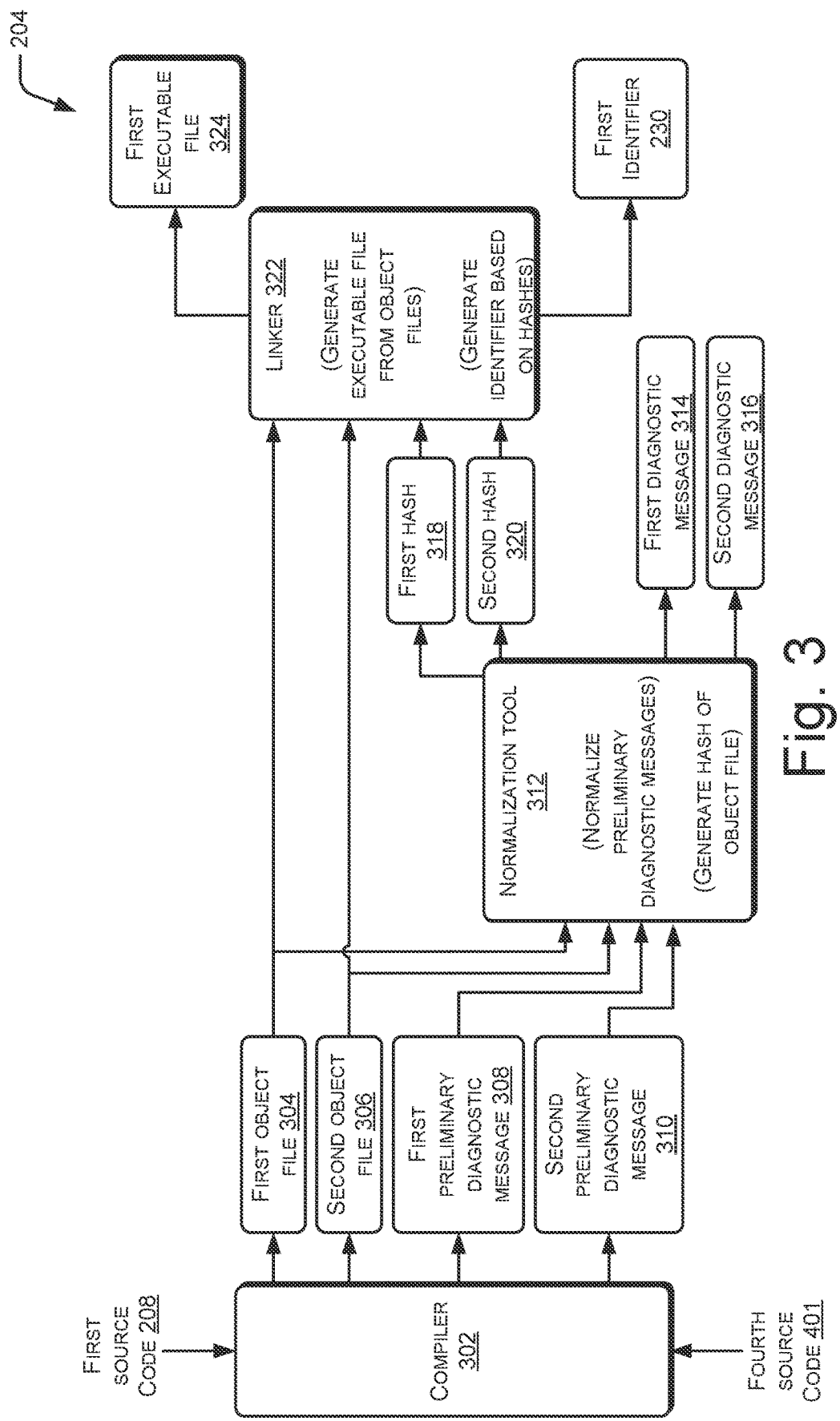
FIG. 3 illustrates functions performed by a developer device, according to an example implementation of the present subject matter.

FIG. 3 illustrates functions performed by the developer device 204, according to an example implementation of the present subject matter. As explained earlier, the developer device 204 includes processing tool(s) 206 (not shown in FIG. 3) that may, among other things, analyze a source code, such as the first source code 208 and a fourth source code 301. The processing tool(s) 206 may include a compiler 302. The compiler 302 may compile a source code s and may generate an object file based on the compilation. For instance, the compiler 302 may compile the first source code 208 and may generate a first object file 304 based on the compilation. Similarly, the fourth source code 301 may be compiled and a second object file 306 may be generated based on the compilation. Each object file may include object code, which has machine language instructions that can control operation of a central processing unit (CPU).

The compilation also leads to the output of preliminary diagnostic messages that indicate defects in the first source code 208. For instance, a first preliminary diagnostic message 308 and a second preliminary diagnostic message 310 may be generated in response to compilation of the first source code 208. Similarly, other preliminary diagnostic messages (not shown in FIG. 3) may be generated in response to compilation of the fourth source code 301.

The diagnostic messages 308 and 310 are referred to as preliminary as they are transformed to normalize them. The normalization of the preliminary diagnostic messages is to be performed because the text using which a particular defect is represented may differ across compilers. For instance, a diagnostic message indicating that a variable is uninitialized as output by the compiler 302 may be "Variable uninitialized", while a corresponding diagnostic message as output by another compiler may be "Variable not initialized". To allow the determination model 202 to work based on diagnostic messages output by various compilers, a normalization tool 312 may normalize the preliminary diagnostic messages outputted by the compiler 302 into normalized diagnostic messages. The normalized diagnostic messages include a first diagnostic message 314, which is obtained by transforming the first preliminary diagnostic message 308, and a second diagnostic message 316, which is obtained by transforming the second preliminary diagnostic message 310. The normalized diagnostic messages may also include diagnostic messages generated by normalizing preliminary diagnostic messages that are generated in response to compilation of the fourth source code 301.

A normalized diagnostic message has the same text regardless of the compiler that was used for analysis of the source code. To perform the normalization, the normalization tool 312 may utilize a lookup table (not shown in FIG. 3) corresponding to the compiler. The lookup table indicates a normalized diagnostic message corresponding to each preliminary diagnostic message that may be generated by the corresponding compiler. In an implementation, the normalization tool 312 may be implemented by execution of a set of instructions (not shown in FIG. 3) by a processor of the developer device 204. The normalization tool 312 may include, for example, TableGen for performing the normalization.

The normalization tool 312 may also generate hashes of object files generated. For example, a first hash 318 of the first object file 304 and a second hash 320 of the second object file 306 may be generated. The hashes may be used for generating unique identifiers corresponding to an executable file.

The processing tool(s) 206 may also include a linker 322. The linker 322 may receive the object files generated by compilation of source codes corresponding to an executable file and combines them to form the executable file. For example, the first object file 304 and the second object file 306 may be combined to form a first executable file 324. The linker 322 may also stitch together hashes generated from object files corresponding to an executable file to form an identifier corresponding to the executable file. For example, the first hash 318 and the second hash 320 may be stitched together to form the first identifier 230. Since the first identifier 230 is generated based on contents of object files generated corresponding to the first executable file 324, the first identifier 230 may be unique to the first executable file 324. In an implementation, the linker 322 may be implemented by execution of a set of instructions (not shown in FIG. 3) by a processor of the developer device 204.

Although analysis of source code is explained with reference to a compiler, in an implementation, the analysis of the source code may include analysis of a source code using a static analysis tool. Accordingly, the normalization tool 312 may transform a preliminary diagnostic message generated by a static analysis tool into a normalized diagnostic message.

Although an executable file is explained as being generated based on two source codes, in other examples, an executable file may be generated based on one or more than two source codes.

Figure 4:
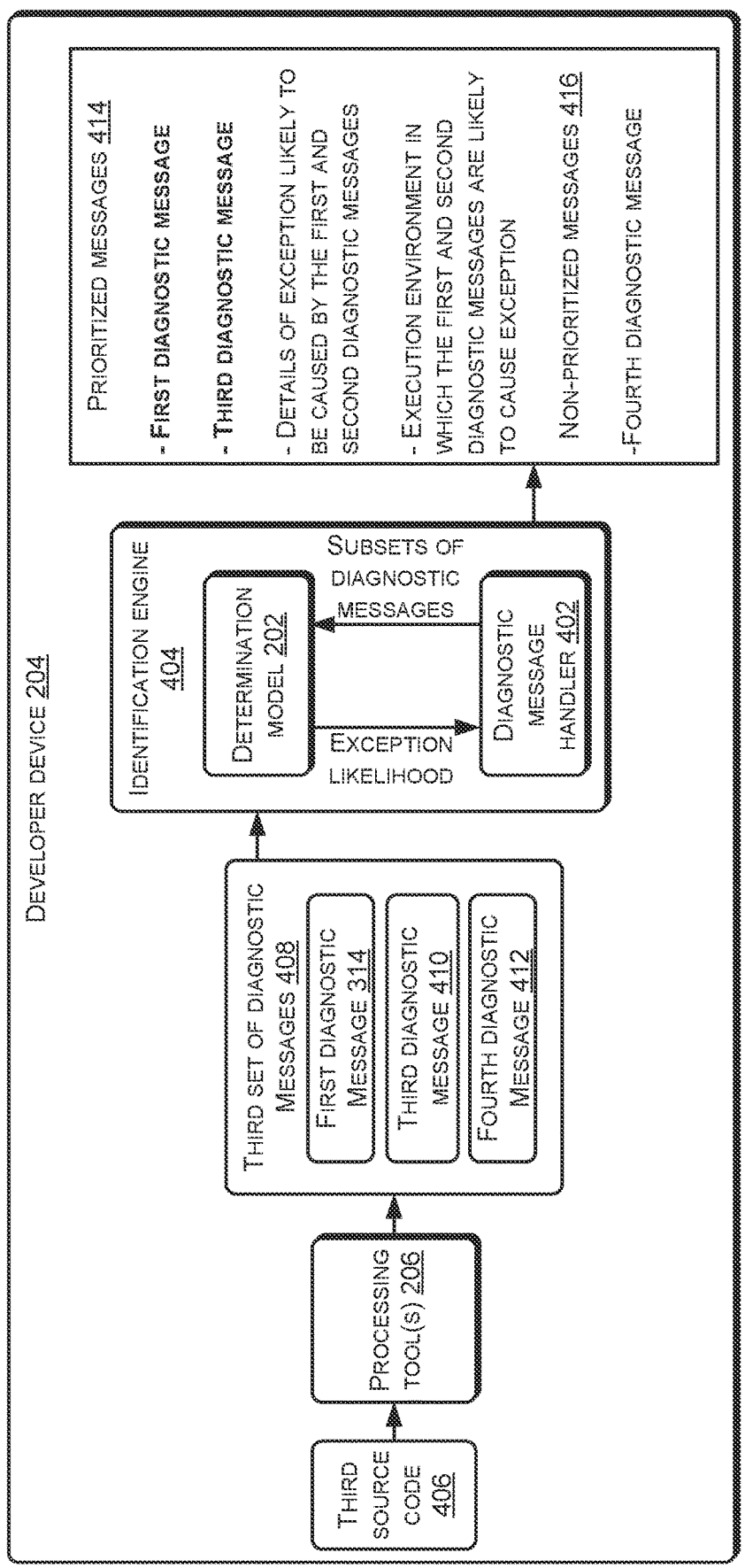
FIG. 4 illustrates a developer device identifying potentially-problematic diagnostic messages by utilizing a determination model, according to an example implementation of the present subject matter.

FIG. 4 illustrates the developer device 204 identifying potentially-problematic diagnostic messages by utilizing the determination model 202, according to an example implementation of the present subject matter. The determination model 202, upon its training, may be sent to a device in which the software development is carried out, such as to the developer device 204. In an example, the determination model 202 may be sent to the developer device 204 along with a compiler or a static analysis tool when the compiler/static analysis tool is released for use. Thus, updates to the determination model 202 due to its continual training may be regularly provided to the developer device 204.

Upon generation of a set of diagnostic messages in the developer device 204 based on analysis of a source code corresponding to an executable file, the determination model 202 may be used to predict if the execution of the executable file would result in an exception. A diagnostic message handler 402 may also be implemented in the developer device 204. The diagnostic message handler 402 may identify a potentially-problematic message or combination by interacting with the determination model 202. The diagnostic message handler 402 may be implemented by the developer device 204 by executing a set of instructions (not shown in FIG. 4). The determination model 202 and the diagnostic message handler 402 may form part of an identification engine 404.

In operation, the processing tool(s) 206 may receive a third source code 406 corresponding to a third executable file (not shown in FIG. 4) that is under development and that is yet to be deployed in an execution environment. The processing tool(s) 206 may analyze the third source code 406 and output a third set of diagnostic messages 408 based on the analysis, also referred to as a third set 408. The third set 408 may include the first diagnostic message 314, a third diagnostic message 410, and a fourth diagnostic message 412. The analysis by the processing tool(s) 206 may also include normalization of a preliminary diagnostic message generated by a compiler or a static analysis tool (not shown in FIG. 4) of the processing tool(s) 206 into a normalized diagnostic message, as explained earlier.

Each diagnostic message indicates a defect in the third source code 406. The developer of the third source code 406 may be interested in knowing the potentially-problematic diagnostic messages/combinations from among the third set 408, so that the defects corresponding thereto can be resolved and exceptions that may occur during execution of the third executable file due to those defects can be prevented. Accordingly, the determination model 202 may receive the third set 408 and may predict an exception message that would be generated if the third executable file is executed. The exception message may indicate, for example, an exception is likely to be encountered if the third executable file is executed and may also indicate details of the likely exception.

As explained earlier, the exception may be encountered because of a defect indicated by a diagnostic message or a combination of defects indicated by a combination of diagnostic messages. Accordingly, the outputting of the exception message that an exception is likely to be encountered if the third executable file is executed indicates that the third set 408 includes a potentially-problematic diagnostic message or a potentially-problematic combination of diagnostic messages. The diagnostic message handler 402 may identify the potentially-problematic diagnostic message/combination. To this end, in response to the determination by the determination model 202 that the third set 408 includes a potentially-problematic diagnostic message/combination, the diagnostic message handler 402 may generate a plurality of subsets of diagnostic messages from the third set 408. Each subset may include one or more diagnostic messages of the third set 408. In an example, the diagnostic message handler 402 may generate all possible combinations of diagnostic messages of the third set 408 as subsets. For instance, a first subset may include the first diagnostic message 314 and the third diagnostic message 410, a second subset may include the third diagnostic message 410 and the fourth diagnostic message 412, a third subset may include the first diagnostic message 314 and the fourth diagnostic message 412, a fourth subset may include the first diagnostic message 314 alone, a fifth subset may include the third diagnostic message 410 alone, and a sixth subset may include subset may include the fourth diagnostic message 412 alone. The different subsets may be provided as inputs to the determination model 202.

In an implementation, the order in which the diagnostic messages appear in a set may be captured in each subset generated by the diagnostic message handler 402. Accordingly, a diagnostic message that appears before another diagnostic message in a set appears before the other diagnostic message in each subset having both the diagnostic messages. For example, if the third set 408 has the first diagnostic message 314 followed by the third diagnostic message 410, followed by the fourth diagnostic message 412, the first diagnostic message 314 may appear before the third diagnostic message 410 in the first subset, and the third diagnostic message 410 may appear before the fourth diagnostic message 412 in the second subset. The order of diagnostic messages may be preserved in each subset because, as explained earlier, the order of defects in a source code may determine whether an exception may be encountered, and the determination model 202 may predict whether an exception is likely to occur based on the order of diagnostic messages in an inputted set.

The determination model 202 may predict an exception message corresponding to each subset. An exception message corresponding to a subset indicates whether an exception is likely to be encountered during execution of the third executable file if the third source code 406 has only those defects that are indicated by the subset of diagnostic messages. Accordingly, the exception message corresponding to the subset indicates whether the subset includes a potentially-problematic diagnostic message or combination. The indication as to whether the subset includes a potentially-problematic diagnostic message or combination may also be referred to as an exception likelihood.

Based on the exception likelihoods received from the determination model 202, a potentially-problematic set may be identified from the third set 408. The potentially-problematic set includes a potentially-problematic diagnostic message or a potentially-problematic combination of diagnostic messages. The identification of the potentially-problematic set will be explained below with the help of a few examples As explained above, each subset includes a diagnostic message or a combination of diagnostic messages. One or more of the subsets may have the potentially-problematic diagnostic message/combination. For each subset having the potentially-problematic diagnostic message/combination, a corresponding exception message may indicate that an exception is likely to be caused. A subset for which the corresponding exception message indicates that an exception is likely to be caused may be referred to as an exception-likely subset. The diagnostic message handler 402 may identify the potentially-problematic diagnostic message or combination based on the exception likelihoods received for the various subsets. For instance, the diagnostic message handler 402 may identify the exception-likely subset having the least number of diagnostic messages. The diagnostic messages of the identified subset may be identified as the potentially-problematic combination of diagnostic messages. If the identified subset has a single diagnostic message, the single diagnostic message may be identified as the potentially-problematic diagnostic message. For instance, if the first subset having the first diagnostic message 314 and the third diagnostic message 410 and the fourth subset having the first diagnostic message 314 alone are identified as the exception-likely subsets, the first diagnostic message 314 may be identified as the potentially-problematic diagnostic message. If the first subset is an exception-likely subset while the fourth subset and the fifth subset (having the third diagnostic message 410 alone) are not, it may be inferred that the first diagnostic message 314 or the third diagnostic message 410 in isolation are not potentially-problematic, and the combination of the first diagnostic message 314 and the third diagnostic message 410 is potentially-problematic.

In an example, the diagnostic message handler 402 may not generate all possible combinations of diagnostic messages of a set as subsets. Instead, the diagnostic message handler 402 may divide the diagnostic messages into two subsets, such as a first subset and a second subset. The first subset and the second subset are mutually exclusive, e.g., do not have any common diagnostic message between them and a union of the two subsets yields the set. For example, the first subset may have half of the diagnostic messages in the set and the second subset has the remaining diagnostic messages. If there are odd number of diagnostic messages in the set, the number of diagnostic messages in the first subset may be one more than that in the second subset. For example, if the third set 408 has 64 diagnostic messages, the first subset may have the first 32 diagnostic messages from the third set 408, and the second subset may have the remaining 32 diagnostic messages. If the third set 408 has 65 diagnostic messages, the first subset may have the first 33 diagnostic messages from the third set 408, and the second subset may have the remaining 32 diagnostic messages.

The diagnostic message handler 402 may then provide the first and second subsets as inputs to the determination model 202 and may receive the exception likelihoods for the two subsets. The exception likelihoods may indicate, for example, that the first subset is an exception-likely subset and the second subset is not an exception-likely subset. The diagnostic message handler 402 may then divide the exception-likely subset into two subsets, where both subsets have the same number of diagnostic messages (if the exception-likely subset has an even number of diagnostic messages) or where one subset has one diagnostic message more than the other subset (if the exception-likely subset has an odd number of diagnostic messages). The subsets obtained by dividing the exception-likely subset is then supplied to the determination model 202 and their corresponding exception likelihoods are obtained. The subset that is determined as an exception-likely subset may be further divided into two subsets and supplied to the determination model 202.

The division of the subsets, the supplying of the divided subsets to the determination model 202, and the sub-division of exception-likely subset based on the exception likelihood may continue until the smallest exception-likely subset is identified. The smallest exception-likely set is determined to be a potentially-problematic set, and may include the potentially-problematic diagnostic message/combination. This will be explained with the help of an example where the third set 408 has 64 diagnostic messages. As explained above, the third set may be divided into two subsets each having 32 diagnostic messages. Consider that the first subset is determined as the exception-likely subset. Accordingly, the first subset is divided into two sets of 16 diagnostic messages each. Consider that such a division is carried out until a subset having four diagnostic messages is identified as an exception-likely subset. Now, if neither of the two subsets generated from this exception-likely subset (each having two diagnostic messages) is exception-likely, the diagnostic message handler 402 may infer that the subset having the four diagnostic messages is the potentially-problematic set, and that the potentially-problematic combination has all the four diagnostic messages of the potentially-problematic set. However, if one of the two subsets of two diagnostic messages is exception-likely, such a subset may be further divided into two subsets of one diagnostic message each. If one of those subsets is exception-likely, the diagnostic message handler 402 may identify the diagnostic message of that subset as the potentially-problematic diagnostic message.

Thus, by recursively dividing exception-likely subsets into two subsets, the potentially-problematic set can be quickly obtained. For example, if a set of diagnostic messages has $2^n$ diagnostic messages, the potentially-problematic diagnostic message/combination can be identified in a maximum of 'n' recursions. Accordingly, such a technique of identifying potentially-problematic diagnostic message/combination can be used when the number of diagnostic messages in a set is large.

In some cases, the division of an exception-likely subset may result in some diagnostic messages of the potentially-problematic combination to move to one subset and other diagnostic messages of the potentially-problematic combination to move to the other subset. For example, consider that an exception-likely subset has four diagnostic messages and that the potentially-problematic combination is a combination of the second and third diagnostic messages in the exception-likely subset. In such a case, the division of the subset results in a first subset having the first and second diagnostic messages and a second subset having the third and fourth diagnostic messages. As will be appreciated, in case of such a division, neither subset formed by the division may be an exception-likely subset. Accordingly, in an implementation, if a first subset and a second subset formed by division of an exception-likely subset does not result in the identification of an exception-likely subset, the diagnostic message handler 402 forms a new subset with the last few diagnostic messages from the first subset and the first few diagnostic messages from the second subset. For example, the last 25% of diagnostic messages in the first subset and the first 25% of diagnostic messages in the second subset may be collated to form a new subset. The new subset may then be supplied to the determination model 202.

If the determination model 202 determines that the new subset is an exception-likely one, the diagnostic message handler 402 may determine that the new subset is the potentially-problematic set and that the diagnostic messages of the potentially-problematic set form the potentially-problematic combination. If, on the other hand, the determination model 202 determines that the new subset is not an exception-likely one, the diagnostic message handler 402 may infer that a diagnostic message of the potentially-problematic combination that is present in the first subset is absent in the new subset or a diagnostic message of the potentially-problematic combination that is present in the second subset is absent in the new subset. For instance, consider that the first subset has first through fourth diagnostic messages and that the second subset has fifth through eighth diagnostic messages. Consider also that the third through fifth diagnostic messages form the potentially-problematic combination. Accordingly, if the new subset having the fourth diagnostic message from the first subset and the fifth diagnostic message from the second subset, the determination model 202 may determine that the new subset is not exception-likely. In such a case, the diagnostic message handler 402 may form a further new subset having more diagnostic messages starting from the last diagnostic message of the first subset (e.g., last 50% diagnostic messages) and more diagnostic messages starting from the first diagnostic message in the second subset (e.g., first 50% diagnostic messages). For example, the new subset may be formed with the last two diagnostic messages of the first subset (third and fourth diagnostic messages) and the first two diagnostic messages of the second subset (fourth and fifth diagnostic messages). If the determination model 202 determines the newly-formed subset as an exception-likely one, the newly-formed subset may be determined as the potentially-problematic set and the diagnostic messages of the potentially-problematic set may be identified as the potentially-problematic combination.

If the determination model 202 determines that the newly-formed subset is not exception-likely, the diagnostic message handler 402 may form another new subset that has even more diagnostic messages starting from the last diagnostic message of the first subset (e.g., last 75% diagnostic messages of the first subset) and even more diagnostic messages starting from the first diagnostic message of the second subset (e.g., first 75% diagnostic messages of the second subset). In this manner, the size of the new subset is progressively increased until an exception-likely subset is identified, and the identified exception-likely subset is identified as the potentially-problematic set.

In some cases, the exception-likely subset that is identified as the potentially-problematic set may have more diagnostic messages than the actual potentially-problematic combination. For instance, consider that the first subset has first through fourth diagnostic messages and that the second subset has fifth through eighth diagnostic messages. Consider also that the third through fifth diagnostic messages form the potentially-problematic combination. However, the new subset identified as exception-likely, and consequently, identified as the potentially-problematic combination may have the third through sixth diagnostic messages. Thus, the developer may have to resolve the defect indicated by the sixth diagnostic message even though the defect may not contribute to the exception. However, the identification of additional diagnostic messages as forming part of the potentially-problematic combination may not significantly impact developer productivity, as the number of such additional diagnostic messages is likely to be less.

In an implementation, the subsets formed by dividing a set or a subset and the subsets formed by including additional diagnostic messages from the previously-formed subsets may preserve the order in which diagnostic messages appeared in the parent set, thereby allowing identification of the sequence of diagnostic messages that is potentially-problematic.

Upon identification of the potentially-problematic set, the diagnostic message handler 402 may prioritize the diagnostic messages of the potentially-problematic set, to indicate to the developer that these message(s) are likely to cause exception during execution of the third executable file. Further, the diagnostic message handler 402 may not prioritize the diagnostic messages that are not part of the potentially-problematic set, as they are unlikely to cause exceptions during execution of the third executable file.

For the prioritization, in an implementation, the diagnostic message handler 402 may split the diagnostic messages into a list of prioritized messages 414, which includes the potentially-problematic diagnostic message/combination, and a list of non-prioritized messages 416, which includes the remaining diagnostic messages. Further, the prioritized messages 414 may be indicated at the top of a display screen to indicate the prioritization, and the non-prioritized messages 416 may be displayed at the bottom of the display screen (not shown in FIG. 4). Other techniques of prioritization may also be utilized, such as highlighting the potentially-problematic diagnostic message/combination in a different color and increasing font size. In another example, the diagnostic messages that are not potentially-problematic and that do not form part of a potentially-problematic combination may be suppressed, and not displayed on the display screen. In a further example, the diagnostic messages that are potentially problematic and that are part of a potentially-problematic combination may be elevated to an 'error' category and the build of the source code may be prevented until the defects indicated by the elevated diagnostic messages are resolved. To elevate a diagnostic message into an error category, the diagnostic message handler 402 may provide the diagnostic message to the compiler, and the compiler may display the diagnostic message as an error message. Further, the compiler may not generate an object file until the defect indicated by that diagnostic message persists in the source code.

Since the potentially-problematic diagnostic messages are prioritized and the remaining diagnostic messages are not prioritized, the developer may focus on resolving the defects indicated by the prioritized diagnostic messages and may ignore the remaining diagnostic messages. Thus, the developer is not to resolve defects indicated by all diagnostic messages, which may be large in number, to ensure an exception-free execution of the third executable file. Therefore, the present subject matter not only ensures exception-free execution of an executable file, but also reduces the amount of time to be spent by the developer on resolving the defects.

In an implementation, in addition to predicting an exception likelihood of a set/subset, the determination model 202 may also provide details of the exception that is likely to be caused. This is possible because of the inclusion of the details of exception in each training exception message for training of the determination model 202, as explained earlier. Therefore, upon identifying the potentially-problematic diagnostic message/combination, the diagnostic message handler 402 may also provide the details of the exception, as indicated by the determination model 202, in addition to prioritizing the potentially-problematic diagnostic message/combination.

The determination model 202 may also provide details of an execution environment in which the identified diagnostic message/combination is potentially problematic. The determination model 202 may provide such details because of the inclusion of the details of execution environment in which an exception is encountered for training of the determination model 202, as explained earlier.

Figure 5:
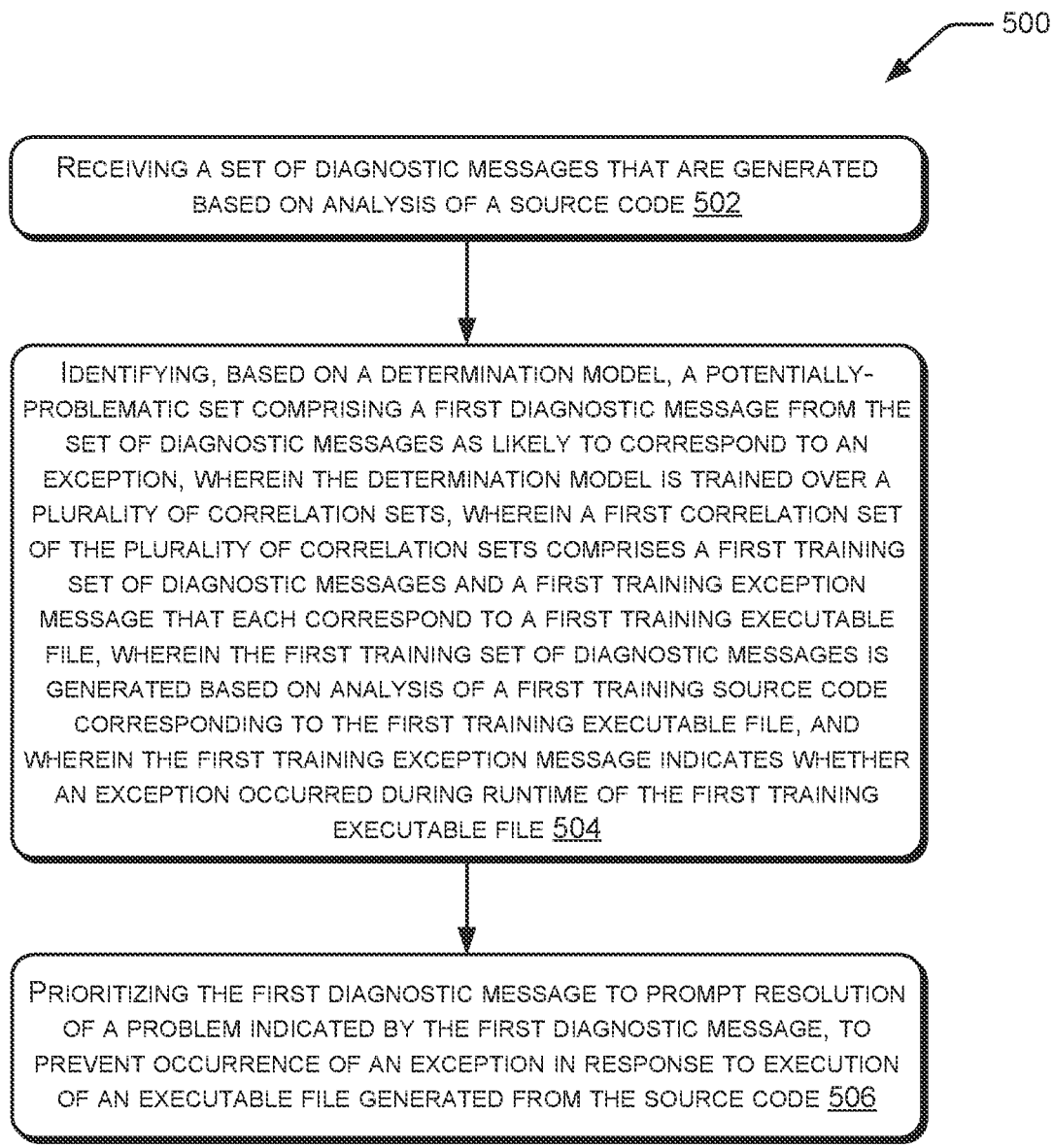
FIG. 5 illustrates a method for identifying diagnostic messages that are likely to cause exceptions, according to example implementations of the present subject matter.
Figure 6:
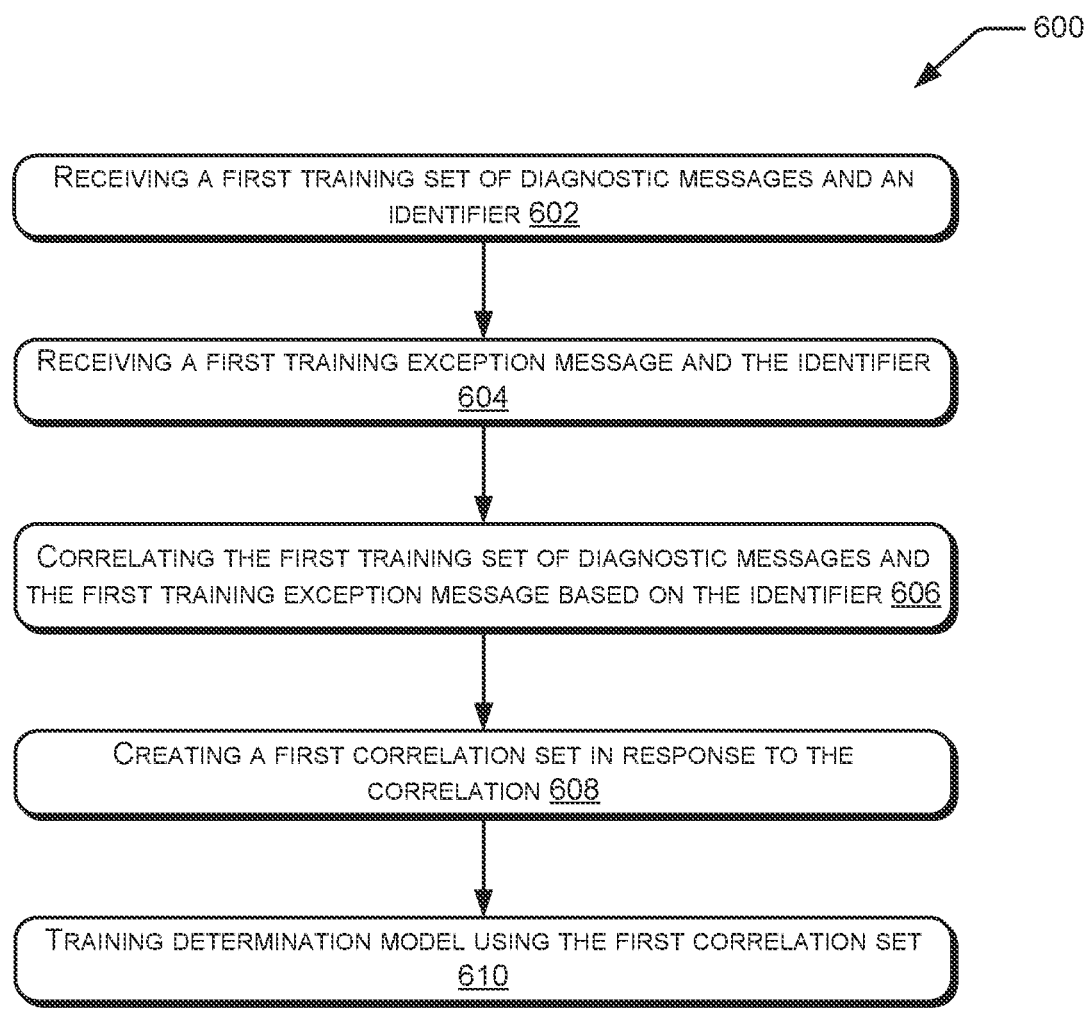
FIG. 6 illustrates a method for training a determination model, according to an example implementation of the present subject matter.

FIGS. 5 and 6 illustrate methods 500 and 600, respectively, for identifying diagnostic messages that are likely to cause exceptions, according to example implementations of the present subject matter. The orders in which the methods 500 and 600 are described is not intended to be construed as a limitation, and any number of the described method blocks may be combined in any order to implement the methods 500 and 600, or alternative methods. Furthermore, the methods 500 and 600 may be implemented by processing resource(s) or computing device(s) through any suitable hardware, non-transitory machine-readable instructions, or a combination thereof.

It may be understood that blocks of the methods 500 and 600 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the methods 500 and 600 may be performed by a computing device. For instance, the method 500 may be performed by the developer device 204 and the method 600 may be performed by the training device 216. Although the methods 500 and 600 may be implemented in a variety of systems, the methods 500 and 600 are described in relation to the system 100, for ease of explanation.

Referring to method 500, at block 502, a set of diagnostic messages is received. In an example the set of diagnostic messages may be received by an identification engine, such as the identification engine 404. The set of diagnostic messages are diagnostic messages that are generated based on analysis of a source code. The diagnostic messages may be non-error diagnostic messages, such as warning messages. The set of diagnostic messages may be, for example, the third source code 406 and the set of diagnostic messages may be, for example, the third set of diagnostic messages 408.

At block 504, a potentially-problematic set is identified from the set of diagnostic messages as likely to correspond to an exception. The potentially-problematic set includes a first diagnostic message and is a subset of the set of diagnostic messages. In an example, the potentially-problematic set includes a plurality of diagnostic messages. The plurality of diagnostic messages may include a potentially-problematic combination of diagnostic messages. The identification may be based on a determination model, such as the determination model 202.

The determination model is trained over a plurality of correlation sets, as explained with reference to FIG. 2. A first correlation set of the plurality of correlation sets includes a first training set of diagnostic messages and a first training exception message that each correspond to a first training executable file. The first training set of diagnostic messages is generated based on analysis of a first training source code corresponding to the first training executable file, and the first training exception message indicates whether an exception occurred during execution of the first training executable file. The first training source code is said to correspond to the first training executable file because the first training executable file may be generated from the first training source code, for example, upon compilation of the first training source code. The first correlation set may be, for example, the first correlation set 224. The training of the determination model may have been carried out in a training device, such as the training device 216. Further, the identification engine may be implemented on a device on which software development is carried out, such as the developer device 204. The identification engine may be implemented by executing a set of instructions.

In an example, identifying the first diagnostic message includes determining, by the determination model, based on the training, that the set of diagnostic messages includes a potentially-problematic diagnostic message or a potentially-problematic combination of diagnostic messages. In response to the determination, a plurality of subsets of diagnostic messages may be generated from the set of diagnostic messages. The generation may be, for example, by the diagnostic message handler 402. Further, the determination model determines a subset of diagnostic messages from among the plurality of subsets that includes the potentially-problematic diagnostic message or the potentially-problematic combination. Subsequently, the potentially-problematic set may be identified based on a subset of diagnostic messages that is determined as having the potentially-problematic diagnostic message or the potentially-problematic combination, as explained with reference to FIG. 4. In an example, the potentially-problematic set may have a diagnostic message that is not potentially-problematic and that is not part of a potentially-problematic combination.

At block 506, the identification engine prioritizes the first diagnostic message to prompt resolution of a defect indicated by the first diagnostic message. The resolution of the defect prevents occurrence of an exception if an executable file generated from the source code is executed.

In an example, as described above, the potentially-problematic set includes a plurality of diagnostic messages including a potentially-problematic combination of diagnostic messages. For instance, a combination of defects indicated by the potentially-problematic combination may be likely to cause an exception, as explained above. In response to such an identification, at block 506, each message of the identified combination is prioritized.

In an example, each training exception message that indicates occurrence of an exception also includes information regarding the exception. Accordingly, the method includes determining information regarding the exception that is likely to be caused by the defect indicated by the first diagnostic message. Further, prioritizing the first diagnostic message includes outputting information regarding the exception that is likely to be caused by the defect indicated by the first diagnostic message, as explained with reference to FIG. 4.

In an example, a first analysis tool, such as a first static analysis tool or a first compiler, generates a set of preliminary diagnostic messages, which corresponds to the set of diagnostic messages explained at block 502. Each preliminary diagnostic message has a text that is specific to the first analysis tool. For instance, a particular defect is represented using different texts by different analysis tools. Accordingly, a first preliminary diagnostic message generated by the first analysis tool and a corresponding preliminary diagnostic message (e.g., the preliminary diagnostic message that indicates to the same defect as the first preliminary diagnostic message) that would be generated by a second analysis tool based on analysis of the source code are different. To apply the method 500 for a variety of analysis tools, the method 500 may include normalizing each preliminary diagnostic message into a corresponding normalized diagnostic message. For instance, the first preliminary diagnostic message is normalized into the first diagnostic message. In this manner, each preliminary diagnostic message of the set of preliminary diagnostic messages is normalized, to form the set of diagnostic messages, which is received at block 502.

FIG. 6 illustrates a method 600 for training the determination model, according to an example implementation of the present subject matter. The method 600 may be performed, for example, in the training device 216.

At block 602, the first training set of diagnostic messages and an identifier corresponding to the first training executable file may be received, for example, from the developer device. The first training set of diagnostic messages may be generated by the developer device based on analysis of the first training source code. Further, the identifier may also be generated by the developer device, as explained above. The developer device may also tag the first training set of diagnostic messages and the first training executable file with the identifier. In addition to sending the first training set of diagnostic messages and the identifier to the training device, the developer device may also send the first training executable file and the identifier to an execution device that is to execute the first training executable file. The execution device may be, for example, the execution device 218.

At block 604, the training device may receive the first training exception message and the identifier from the execution device. To generate the first training exception message, the execution device executes the first training executable file, captures details of an exception encountered during the execution, and generates the first training exception message including details of the exception.

At block 606, the training device correlates the first training set of diagnostic messages and the first training exception message based on the identifier and at block 608, the training device creates the first correlation set in response to the correlation. Subsequently, at block 610, the determination model is trained. The training is performed using the first correlation set and other correlation sets generated in the above manner.

Figure 7:
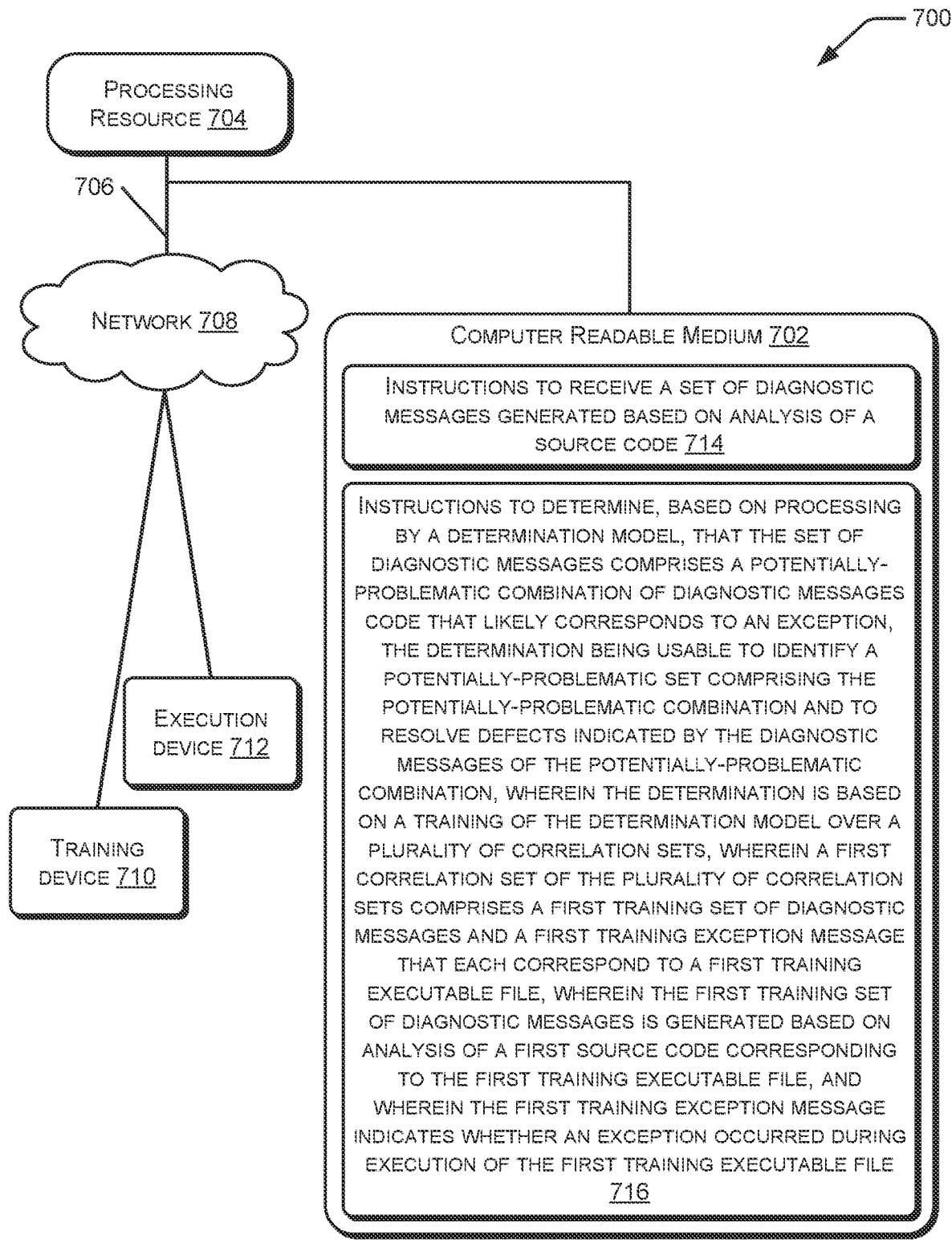
FIG. 7 illustrates a computing environment implementing a non-transitory computer-readable medium for identifying diagnostic messages that are likely to correspond to an exception, according to an example implementation of the present subject matter.

FIG. 7 illustrates a computing environment 700 implementing a non-transitory computer-readable medium for identifying diagnostic messages that are likely to correspond to an exception, according to an example implementation of the present subject matter. In an example, the non-transitory computer-readable medium 702 may be utilized by a computing device, such as the developer device 204. In an example, the computing environment 700 may include a processing resource 704 communicatively coupled to the non-transitory computer-readable medium 702 through a communication link 706. The processing resource 704 may be, for example, the processor 102.

The non-transitory computer-readable medium 702 may be, for example, an internal memory device or an external memory device. In an example, the communication link 706 may be a direct communication link, such as any memory read/write interface. In another example, the communication link 706 may be an indirect communication link, such as a network interface. In such a case, the processing resource 704 may access the non-transitory computer-readable medium 702 through a network 708. The network 708 may be a single network or a combination of multiple networks and may use a variety of different communication protocols.

The processing resource 704 and the non-transitory computer-readable medium 702 may also be communicatively coupled to a training device 710, such as the training device 216, and an execution device 712, such as the execution device 218.

In an example implementation, the non-transitory computer-readable medium 702 includes a set of computer-readable instructions for identifying a potentially-problematic set that includes a potentially-problematic combination of diagnostic messages. The set of computer-readable instructions may include instructions 714 and instructions 716. The set of computer-readable instructions can be accessed by the processing resource 704 through the communication link 706 and subsequently executed. In an example, the set of computer-readable instructions may include the instructions to implement the identification engine 404.

Referring to FIG. 7, the instructions 714 cause the processing resource 704 to receive a set of diagnostic messages generated based on analysis of a source code. Each diagnostic message indicates a defect in the source code. The source code may be, for example, the third source code 406 and the set of diagnostic messages may be, for example, the third set of diagnostic messages 408. The diagnostic messages may be non-error diagnostic messages, such as warning messages.

The instructions 716 cause the processing resource 704 to determine that the set of diagnostic messages includes a potentially-problematic combination of diagnostic messages that likely corresponds to an exception. For instance, it may be determined that the source code includes a combination of defects that are likely to cause an exception if an executable file generated from the source code is executed. The determination may be based on processing by determination model, such as the determination model 202. The determination model may be a neural network model, such as an LSTM model. The determination can be used to identify a potentially-problematic set including the potentially-problematic combination of diagnostic messages and to resolve defects indicated by diagnostic messages of the potentially-problematic combination. The determination is based on a training of the determination model over a plurality of correlation sets. A first correlation set of the plurality of correlation sets includes a first training set of diagnostic messages and a first training exception message that each correspond to a first training executable file. The first training set of diagnostic messages is generated based on analysis of a first source code corresponding to the first training executable file, and the first training exception message indicates whether an exception occurred during execution of the first training executable file. The first correlation set may be, for example, the first correlation set 224.

In an example, the instructions are executable to determine information of the exception that is likely to be caused if defects indicated by the diagnostic messages of the potentially-problematic combination are unresolved. Further, it may be determined that defects indicated by the potentially-problematic combination are likely to cause an exception if the executable file is executed in a first execution environment. That is, the determination model may provide details of an execution environment in which the combination of defects indicated by the potentially-problematic combination is likely to cause an exception.

In an example, the non-transitory computer-readable medium 702 includes instructions executable to generate, in response to a determination that the set of diagnostic messages comprises a potentially-problematic combination of diagnostic messages, a plurality of subsets of diagnostic messages from the set of diagnostic messages. Further, an exception likelihood corresponding to each subset is determined. Each exception likelihood indicates whether the corresponding subset includes a potentially-problematic combination of diagnostic messages. Based on the exception likelihoods received from the determination model, the potentially-problematic set is identified. Further, each diagnostic message of the potentially-problematic set may be prioritized, as explained with reference to FIG. 4. In an example, the potentially-problematic set may include one or more diagnostic messages that are not part of the potentially-problematic combination.

The present subject matter allows identification of potentially-problematic diagnostic messages and combinations and prioritizing such diagnostic messages and combinations. The prioritization may be used by a developer to resolve the defects indicated by the diagnostic messages. Accordingly, occurrence of exceptions due to these defects during execution of the corresponding executable file may be avoided.

The identification engine of the present subject matter may indicate with high confidence as to the individual diagnostic messages and combinations of diagnostic messages that are potentially problematic. Thus, a developer may focus on resolving the defects indicated by the individual diagnostic messages and the diagnostic messages in the combination, while ignoring the other diagnostic messages. Thus, the present subject matter ensures exception-free execution of executable files while also reducing the number of defects to be resolved to ensure exception-free execution.

The present subject matter establishes a correlation between diagnostics generated at the development environment and runtime faults caused in the execution environment. The techniques of the present subject matter can be used with a variety of compilers and static analysis tools. The present subject matter may also indicate the details of exceptions that are likely to be caused due to the defects indicated by the diagnostic messages, so that the developer can gauge the impact caused by the various diagnostic messages that are typically ignored. The techniques of the present subject matter can be implemented without making significant changes to a typical software development process.

Although implementations of identification of diagnostic messages corresponding to exceptions have been described in language specific to structural features and/or methods, it is to be understood that the present subject matter is not necessarily limited to the specific features or methods described. Rather, the specific features and methods are disclosed and explained as example implementations.

We claim:

1. A system comprising:
   a processor; and
   a memory comprising instructions executable by the processor to:
   receive a first set of diagnostic messages that are generated based on analysis of a first source code corresponding to a first executable file;
   receive a second set of diagnostic messages that are generated based on analysis of a second source code corresponding to a second executable file;
   receive a first exception message that indicates whether an exception occurred during execution of the first executable file;
   receive a second exception message that indicates whether an exception occurred during execution of the second executable file;
   create a first correlation set comprising the first set of diagnostic messages and the first exception message;
   create a second correlation set comprising the second set of diagnostic messages and the second exception message; and
   train a determination model using the first correlation set and the second correlation set, wherein the training allows the determination model to determine whether a third set of diagnostic messages that are generated based on analysis of a third source code comprises a potentially-problematic diagnostic message or a potentially-problematic combination of diagnostic messages that likely corresponds to an exception.

2. The system of claim 1, wherein, upon the training, the determination model is to:
   receive the third set of diagnostic messages that are generated based on analysis of the third source code; and
   determine whether the third set of diagnostic messages comprises a potentially-problematic diagnostic message or a potentially-problematic combination,
   wherein the memory comprises instructions executable by the processor to:
   generate, in response to the determination that the third set of diagnostic messages comprises a potentially-problematic diagnostic message or a potentially-problematic combination, a plurality of subsets of diagnostic messages from the third set of diagnostic messages;

provide the plurality of subsets of diagnostic messages to the determination model as inputs;

receive, from the determination model, an exception likelihood corresponding to each subset of diagnostic messages, each exception likelihood indicating whether the corresponding subset of diagnostic messages comprises a potentially-problematic diagnostic message;

identify, based on the exception likelihoods received from the determination model, a potentially-problematic set from the third set of diagnostic messages, wherein the potentially-problematic set comprises a diagnostic message or a potentially-problematic combination of diagnostic messages that likely corresponds to an exception; and prioritize the potentially-problematic set to prompt resolution of a defect indicated by the potentially-problematic set.

3. The system of claim 2, wherein, the plurality of sets of diagnostic messages comprises a first subset and a second subset, wherein, in response to a determination, based on an exception likelihood corresponding to the first subset, that the first subset comprises a potentially-problematic diagnostic message or a potentially-problematic combination, the instructions are executable to:

divide the first subset into two subsets; and provide each subset obtained by dividing the first subset to the determination model.

4. The system of claim 1, wherein the instructions to create the first correlation set are to:

receive the first set of diagnostic messages along with an identifier;

receive the first exception message along with the identifier;

correlate the first set of diagnostic messages and the first exception message based on the identifier to provide the first correlation set.

5. The system of claim 4, wherein the identifier is generated based on a hash value of a first object file that is generated from the first source code.

6. The system of claim 1, wherein the determination model is a neural network model and wherein, to train the determination model using the first correlation set and the second correlation set, the instructions are executable to adjust weights and biases of the neural network model.

7. The system of claim 1, wherein an order of diagnostic messages in the first set of diagnostic messages is same as the order in which defects are present in the first source code, wherein the training allows the determination model to identify an order of diagnostic messages for which an exception is likely to be encountered.

8. A method comprising:

receiving, by a processing resource, a set of diagnostic messages that are generated based on analysis of a source code;

identifying, by the processing resource, based on a determination model, a potentially-problematic set comprising a first diagnostic message from the set of diagnostic messages as likely to correspond to an exception, wherein the determination model is trained over a plurality of correlation sets, wherein a first correlation set of the plurality of correlation sets comprises a first training set of diagnostic messages and a first training exception message, wherein the first training set of diagnostic messages is generated based on analysis of a first training source code corresponding to a first training executable file, and wherein the first training exception message indicates whether an exception occurred during execution of the first training executable file; and prioritizing, by the processing resource, the first diagnostic message to prompt resolution of a defect indicated by the first diagnostic message, to prevent occurrence of an exception in response to execution of an executable file generated from the source code.

9. The method of claim 8, wherein the potentially-problematic set comprises a plurality of diagnostic messages comprising a potentially-problematic combination of diagnostic messages, wherein a combination of defects indicated by the potentially-problematic combination is likely to cause an exception, and wherein the method comprises prioritizing each diagnostic message of the potentially-problematic set for resolution.

10. The method of claim 8, wherein identifying the potentially-problematic set comprises:

determining, by the determination model, based on the training, that the set of diagnostic messages comprises a potentially-problematic diagnostic message or a potentially-problematic combination of diagnostic messages;

in response to the determination, generating a plurality of subsets of diagnostic messages from the set of diagnostic messages;

determining, by the determination model, a subset of diagnostic messages from among the plurality of subsets that comprises the potentially-problematic diagnostic message or the potentially-problematic combination of diagnostic messages; and identifying the potentially-problematic set based on a subset of diagnostic messages that is determined as having the potentially-problematic diagnostic message or the potentially-problematic combination of diagnostic messages.

11. The method of claim 8, wherein each training exception message that indicates occurrence of an exception comprises information regarding the exception, wherein the method comprises:

determining information regarding the exception that is likely to be caused by the defect indicated by the first diagnostic message, and wherein, prioritizing the first diagnostic message comprises:

outputting information regarding the exception that is likely to be caused by the defect indicated by the first diagnostic message.

12. The method of claim 8, wherein, to facilitate training of the determination model, the method comprises:

analyzing, by a developer device, the first training source code, the analysis causing generation of a first training set of diagnostic messages;

generating, by the developer device, an identifier corresponding to the first training executable file;

tagging, by the developer device, the first training executable file and the first training set of diagnostic messages with the identifier to allow creation of a first correlation set comprising the first training set of diagnostic messages and a first training exception message, the first training exception message being indicative of whether an exception occurred during execution of the first training executable file;

sending, by the developer device, the first training set of diagnostic messages and the identifier to the training device; and sending, by the developer device, the first training executable file and the identifier to an execution device that is to execute the first training executable file.

13. The method of claim 12, comprising:

receiving, by the training device from the developer device, the first training set of diagnostic messages and the identifier;

receiving, by the training device from the execution device, the first training exception message and the identifier;

correlating, by the training device, the first training set of diagnostic messages and the first training exception message based on the identifier; and creating, by the training device, the first correlation set in response to the correlation.

14. The method of claim 8, comprising:

executing, by an execution device, the first training executable file;

capturing, by the execution device, details of an exception encountered during the execution;

generating, by the execution device, the first training exception message comprising details of the exception; and sending, by the execution device, the first training exception message along with an identifier corresponding to the first training executable file to a training device for training of the determination model.

15. The method of claim 8, comprising:

receiving a first preliminary diagnostic message generated by a first analysis tool based on analysis of the source code, wherein the first preliminary diagnostic message is different from a corresponding preliminary diagnostic message that would be generated by a second analysis tool based on analysis of the source code; and normalizing the first preliminary diagnostic message into the first diagnostic message.

16. A non-transitory computer-readable medium comprising instructions, the instructions being executable by a processing resource to:

receive a set of diagnostic messages generated based on analysis of a source code, wherein each diagnostic message indicates a defect in the source code; and determine, based on processing by a determination model, that the set of diagnostic messages comprises a potentially-problematic combination of diagnostic messages that likely corresponds to an exception, the determination being usable to identify a potentially-problematic set comprising the potentially-problematic combination of diagnostic messages and to resolve defects indicated by diagnostic messages of the potentially-problematic combination, wherein the determination is based on a training of the determination model over a plurality of correlation sets, wherein a first correlation set of the plurality of correlation sets comprises a first training set of diagnostic messages and a first training exception message that each correspond to a first training executable file, wherein the first training set of diagnostic messages is generated based on analysis of a first source code corresponding to the first training executable file, and wherein the first training exception message indicates whether an exception occurred during execution of the first training executable file.

17. The non-transitory computer-readable medium of claim 16, wherein the non-transitory computer-readable medium comprises instructions executable by the processing resource to:

generate, in response to a determination that the set of diagnostic messages comprises a potentially-problematic combination of diagnostic messages, a plurality of subsets of diagnostic messages from the set of diagnostic messages;

determine an exception likelihood corresponding to each subset of diagnostic messages, each exception likelihood indicating whether the corresponding subset of diagnostic messages comprises a potentially-problematic combination of diagnostic messages;

identify, based on the exception likelihoods, the potentially-problematic set; and prioritize each diagnostic message of the potentially-problematic set.

18. The non-transitory computer-readable medium of claim 16, wherein the instructions are executable to determine information of the exception that is likely to be caused if defects indicated by the diagnostic messages of the potentially-problematic combination are unresolved.

19. The non-transitory computer-readable medium of claim 16, wherein the instructions are executable to determine that defects indicated by the potentially-problematic combination are likely to cause an exception if the executable file is executed in a first execution environment.

20. The non-transitory computer-readable medium of claim 16, wherein the determination model is a long short-term memory (LSTM) model.

* * * * *